US008611351B2

(12) United States Patent  (10) Patent No.: US 8,611,351 B2
Gooch et al.  (45) Date of Patent: *Dec. 17, 2013

(54) MARKED PACKET FORWARDING

(75) Inventors: Mark Gooch, Roseville, CA (US);
Bruce E. LaVigne, Roseville, CA (US);
Alan R. Albrecht, Granite Bay, CA
(US); Steven G. Jorgensen, Newcastle,
CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 185 days.

This patent is subject to a terminal disclaimer.

(21) Appl. No.: 13/026,803

(22) Filed: Feb. 14, 2011

(65) Prior Publication Data

US 2011/0134932 A1  Jun. 9, 2011

Related U.S. Application Data

(62) Division of application No. 11/788,179, filed on Apr. 19, 2007, now Pat. No. 7,903,655.

(51) Int. Cl.
*H04L 12/24* (2006.01)

(52) U.S. Cl.
USPC ...... 370/392; 370/395.52; 370/389; 370/401; 709/223; 709/236; 726/23; 726/24

(58) Field of Classification Search
USPC ............ 370/392, 401, 409, 463, 389, 389.32, 370/395.52; 709/223, 236
See application file for complete search history.

(56) References Cited

U.S. PATENT DOCUMENTS

| | | | |
|---|---|---|---|
| 6,763,018 B1 | 7/2004 | Puthiyandyil et al. | |
| 6,975,627 B1 * | 12/2005 | Parry et al. ................... | 370/389 |
| 7,093,027 B1 | 8/2006 | Shabtay et al. | |
| 7,103,045 B2 | 9/2006 | LaVigne et al. | |
| 7,111,072 B1 | 9/2006 | Matthews et al. | |
| 7,159,242 B2 | 1/2007 | Genty et al. | |
| 7,292,573 B2 | 11/2007 | LaVigne et al. | |
| 7,349,979 B1 | 3/2008 | Cieslak et al. | |
| 7,506,065 B2 | 3/2009 | LaVigne et al. | |
| 7,607,010 B2 * | 10/2009 | Cavanaugh ................... | 713/165 |
| 7,685,436 B2 * | 3/2010 | Davis et al. .................. | 713/192 |
| 7,752,324 B2 * | 7/2010 | Hamadeh et al. ............. | 709/230 |
| 2003/0225933 A1 * | 12/2003 | Suzuki ......................... | 709/321 |
| 2004/0111636 A1 * | 6/2004 | Baffes et al. ................. | 713/201 |
| 2005/0081058 A1 | 4/2005 | Chang et al. | |
| 2005/0220091 A1 | 10/2005 | LaVigne et al. | |
| 2006/0050719 A1 | 3/2006 | Barr et al. | |
| 2006/0056297 A1 | 3/2006 | Bryson et al. | |
| 2006/0174336 A1 | 8/2006 | Chen | |
| 2006/0179485 A1 * | 8/2006 | Longsine et al. ............... | 726/23 |
| 2006/0193300 A1 * | 8/2006 | Rawat et al. ................. | 370/338 |
| 2007/0097976 A1 * | 5/2007 | Wood et al. .................. | 370/401 |
| 2007/0195776 A1 | 8/2007 | Zheng et al. | |
| 2008/0002736 A1 * | 1/2008 | Droux et al. ................. | 370/463 |
| 2008/0098113 A1 | 4/2008 | Hansen et al. | |
| 2008/0205415 A1 * | 8/2008 | Morales ........................ | 370/401 |

* cited by examiner

*Primary Examiner* — Andrew Chriss
*Assistant Examiner* — Mohamed Kamara

(57) ABSTRACT

A network, network devices, and methods are described for marked packet forwarding. A network device includes a network chip having a number of network ports for receiving and transmitting packets. The network chip includes logic to decapsulate a packet received from a tunnel, mark the packet with a handle associated with an originating network device of the packet using information from an encapsulation header, and forward the marked packet to a checking functionality having a destination address different from an original destination address of the packet.

15 Claims, 9 Drawing Sheets

MARKED PACKET FORWARDING

RELATED APPLICATIONS

This application is a divisional of U.S. patent application Ser. No. 11/788,179, filed Apr. 19, 2007, now U.S. Pat. No. 7,903,655, the entire contents of which is incorporated herein by reference.

BACKGROUND

Computing networks can include multiple network devices such as routers, switches, hubs, servers, desktop PCs, laptops, and workstations, and peripheral devices, e.g., printers, facsimile devices, and scanners, networked together across a local area network (LAN) and/or wide area network (WAN).

Networks can include an intrusion system (IS), e.g., intrusion prevention system (IPS) and/or intrusion detection system (IDS), which serves to detect unwanted intrusions/activities to the computer network. As used herein, "IS" indicates intrusion system(s), i.e., both the singular and plural. Unwanted network intrusions/activities may take the form of attacks through computer viruses and/or hackers, and misconfigured devices, among others, trying to access the network. To this end, an IS can identify different types of suspicious network traffic and network device usage that can not be detected by a conventional firewall. This includes network attacks against vulnerable services, data driven attacks on applications, host-based attacks such as privilege escalation, denial of service attacks, port scans, unauthorized logins and access to sensitive files, viruses, Trojan horses, and worms, among others.

In previous approaches, to identify suspicious network traffic, data traffic needed to pass through a point of the network where an IS is located. Previously an IS would have been deployed solely as a standalone in-line device. For large network systems, placing an IS in-line with initial client and/or server attach points, in an intended packet path, can be both expensive to implement and very complex to maintain. If the IS is not "in-line", e.g., between one port and another in a network packet's intended path, then suspicious activity may not be detected.

More recently, an IS is located integral to a network device, e.g., an IDS integral to a switch, router, etc. However, the integral IDS configuration suffers many of the same drawbacks as the in-line IS configuration where all network devices in a network are not so protected. This scheme still disperses the IS function, and can still be expensive to implement and/or complex to maintain.

DETAILED DESCRIPTION

Sharing an IS resource among many network devices has the potential advantage to increase the scope of network protection, while reducing expense and user-level complexity, by eliminating the need for dedicated IS resources dispersed throughout the network. However, implementing a centralized IS function requires sending network traffic to the IS resource in lieu of physically locating the IS resource in the flow of network traffic.

In some embodiments network devices identify and divert data packets from their original intended destination, to a remote checking functionality implementing, for example, the network IS or other centralized network resource. After successful processing by the checking functionality, a data packet is returned to its originating network device, i.e., the network device which diverted the packet off to the checking functionality, to resume forwarding to its original destination address using regular packet forwarding logic. Consequently, some means of tracking the identity of each packet's originating network device, and associating it with the packet during its diversion to and from the checking functionality, is desirable. Embodiments of the invention may include networks, network devices, systems, methods, and other embodiments, including executable instructions embodied on a computer readable medium and/or logic.

According to one embodiment, a network device includes a network chip having logic and a number of network ports for the device for receiving and transmitting packets. Packets are securely tunneled to a remote network device communicatively coupled to a network appliance implementing the network's checking functionality. The network chip includes logic to decapsulate a packet received from a tunnel, mark the packet with a handle associated with an originating network device of the packet using information from an encapsulation header, and forward the marked packet to a checking functionality having a destination address different from an original destination address of the packet. The handle is associated with identifying information derived from the encapsulation header indicative of the originating network device.

In some embodiments, the packet is marked by inserting the handle into the packet as a virtual local area network (VLAN) tag. Logic in the checking functionality, or the network device to which the packet is returned from the checking functionality, can then use the handle as an index, i.e., key, to perform a lookup to obtain the identity information, e.g., Internet Protocol (IP) address, of the packet's originating network device.

Figure 1:
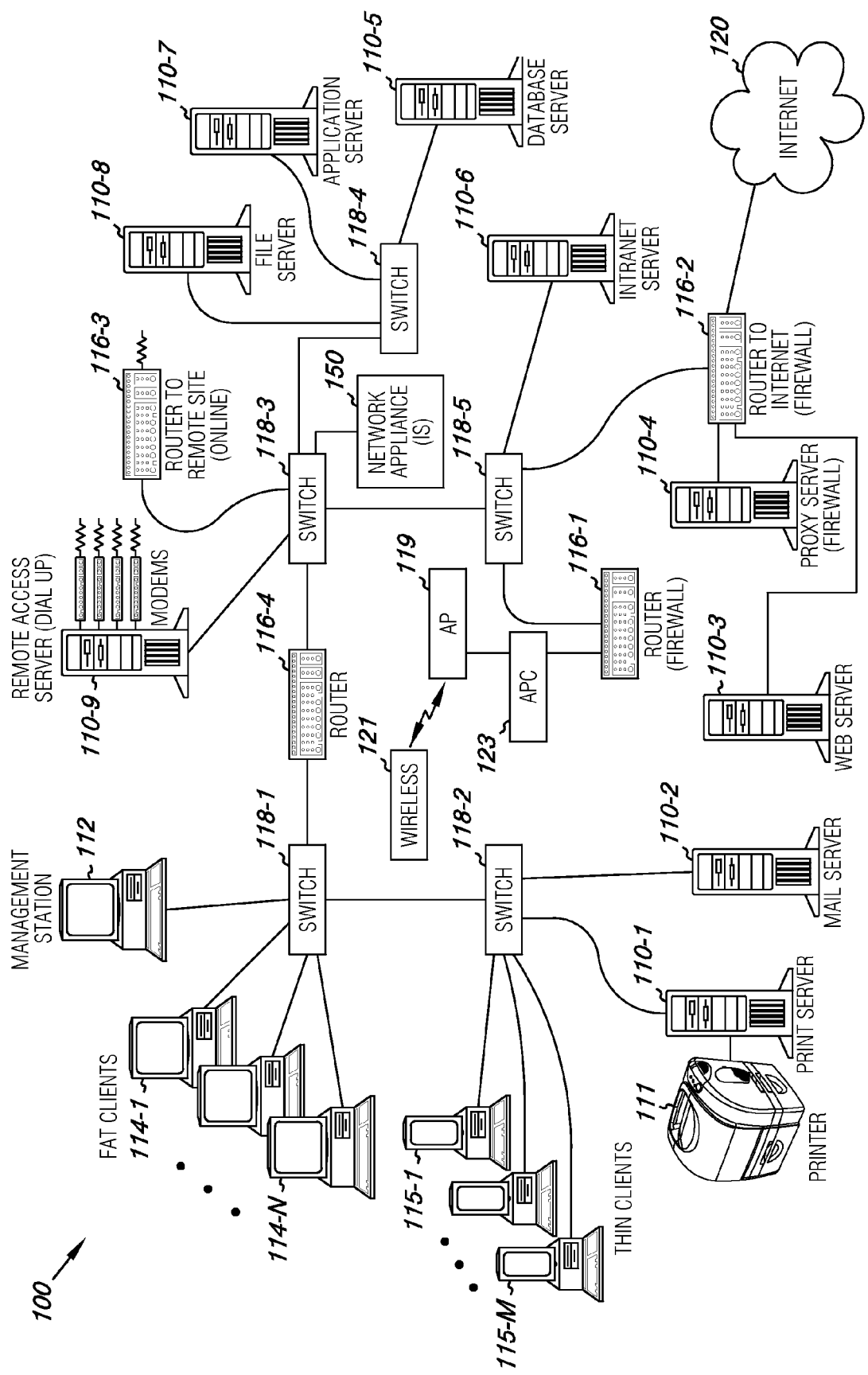
FIG. 1 is an example of a computing device network in which embodiments of the invention can be implemented.

FIG. 1 illustrates an embodiment of a computing device network 100 in which some embodiments of the invention can be implemented. As shown in FIG. 1, a number of devices can be networked together in a LAN, WAN and/or metropolitan area network (MAN) using routers, hubs, switches and the like. As used herein a "network device" means a switch, router, hub, bridge, etc., e.g., a device which may have a processor and memory resources, and is connected to a network 100, as the same will be understood by one of ordinary skill in the art. Although a switch will often be used in this disclosure in describing certain embodiments of the invention, those skilled in the art will realize that embodiments may be implemented with other network devices. As the reader will appreciate, the term network device can also be used to refer to servers, PCs, etc., as illustrated further below.

The example network of FIG. 1 illustrates a print server 110-1 and printer 111 to handle print jobs for the network 100, a mail server 110-2, a web server 110-3, a proxy server (firewall) 110-4, a database server 110-5, an intranet server 110-6, an application server 110-7, a file server 110-8, and a remote access server 110-9. The examples described here do not provide an exhaustive list of servers that may be used in a network.

The network embodiment of FIG. 1 further illustrates a network management station 112, e.g., a server, PC and/or workstation, a number of "fat" clients 114-1, ..., 114-N which can also include PCs and workstations and/or laptops, and a number of "thin" clients 115-1, ..., 115-M. As used herein a "thin client" can refer to a computing device that performs little or no application processing and functions more as an input/output terminal. That is, in this example, a thin client generally relies on the application processing being performed on a server networked thereto. Additionally, a thin client can include a client in a server/client relationship which has little or no storage, as the same will be understood by one of ordinary skill in the art. In contrast, a "fat client" is generally equipped with processor and memory resources, to perform larger application processing and/or storage.

The designators "N" and "M" are used to indicate that a number of fat or thin clients can be attached to the network 100. The number that N represents can be the same or different from the number represented by M. The embodiment of FIG. 1, illustrates that all of these example network devices can be connected to one another and/or to other networks using routers, 116-1, 116-2, 116-3, and 116-4, and hubs and/or switches 118-1, 118-2, 118-3, 118-4, and 118-5. As noted above, such network devices can include a processor in communication with a memory and may include network chips having hardware logic, e.g., in the form of application specific integrated circuits (ASICs), associated with the number of network ports. The term "network" as used herein is not limited to the number, type, and/or configuration of network devices illustrated in FIG. 1.

Additionally as the reader will appreciate, a number of mobile devices, e.g., wireless device 121, can connect to the network 100 using a wireless air interface, e.g., 802.11, which can provide a signal link between the mobile device 121 and an access point (AP) 119. The AP 119 serves a similar role to a base station in a wireless network, as the same will be known and understood by one of ordinary skill in the art. As shown in FIG. 1, the AP 119 can be linked to an access point controller (APC) 123, as the same will be known and understood by one of ordinary skill in the art, which connects the AP 119 over a packet switched signal link, e.g. an Ethernet link, to other network devices, e.g., router 116-1.

As one of ordinary skill in the art will appreciate, each network device in the network 100 can be physically associated with a port of a switch to which it is connected. Information in the form of network packets, e.g., data packets, can be passed through the network 100. Users physically connect to the network through ports or APCs 123 on the network 100. Data frames, or packets, can be transferred between network devices by means of a network device's, e.g., switch's, logic link control (LLC)/media access control (MAC) circuitry, or "engines," as associated with ports on a network device. A network switch forwards network packets received from a transmitting network device to a destination network device based on the header information in received network packets. A network device can also forward packets from a given network to other networks through ports on one or more other network devices. As the reader will appreciate an Ethernet network is described herein. However, embodiments are not limited to use in an Ethernet network, and may be equally well suited to other network types, e.g., asynchronous transfer mode (ATM) networks, etc.

According to embodiments described herein, a checking functionality, e.g., a network appliance intrusion system (IS) which serves to detect and/or evaluate suspicious activity, can be located in a "centralized" location in network 100. As used herein, the term "centralized" means a particular location in the network 100 accessible from a number of network devices, e.g., 118-1, ..., 118-5, whether or not the topographical location is in-line with a given packet's intended network path or topographically central to the network 100. To further explain, in network 100 of FIG. 1, certain network devices, e.g., switches 118-1, 118-2, and 118-5, may be referred to topographically as "edge" network devices and other network devices, e.g., switches 118-3 and router 116-4, may be referred to topographically as "central" network devices. As used herein, "edge" network devices topographically means network devices, e.g., 118-1, having ports connected directly to network clients, e.g., 114-1, ..., 114-N, and 115-1, ..., 115-M, thus being on the "edge" of the network. The network clients can include servers, "fat" and "thin" clients, including mobile network clients connected through an APC, etc., as discussed above. As used herein, "central" network devices topographically means network devices, e.g., switch 118-3, which are connected to other network devices, e.g., switch 118-5, but which are not necessarily connected directly to network clients such as 114-1, ..., 114-N, or 115-1, ..., 115-M, etc.

However, the term "central" in central network devices is not to be confused with the use of the term "centralized." In some embodiments of the present invention, a "centralized" IS, as defined above, may be integral to or associated with an "edge" network device. That is, the topographical location in a given network of the IS can be in association with switch 118-1, connected to "fat" and "thin" clients, 114-1, ..., 114-N, and 115-1, ..., 115-M, in FIG. 1, or equally in association with switch 118-3, or switch 118-5, etc. Embodiments are not limited to the examples described herein. As one or ordinary skill in the art will appreciate, the intent is to place an IS in a topographical location in network 100 which has a sufficiently high bandwidth associated therewith, relative to the bandwidth of other devices attached to the network 100, to perform a sufficient throughput associated with a particular checking functionality. As the reader will appreciate, certain so termed "edge" network devices, e.g., switch 118-1, may in fact have a large network packet traffic bandwidth capability relative to other network devices, e.g., central network devices 118-3, 118-4, etc., in the network 100 so as to be worthwhile candidates for associating an IS, e.g., checking functionality, therewith. Embodiments are not limited to the examples given in connection with FIG. 1.

As used herein, the term "network appliance" is used to mean an add-on device, e.g., "plug-in" or "application module," to a network as contrasted with a "network device", e.g., router, switch, and/or hub, etc., which are sometimes considered more as "backbone" component devices to a network. As the reader will appreciate, a network appliance, e.g., 150 can include processor and memory resources capable of storing and executing instructions to perform a particular role or function. A network appliance can also include one or more network chips, e.g., ASICs, having logic and a number of ports, as the same will be known and understood by one of ordinary skill in the art.

In the example network implementation of FIG. 1 a network appliance 150 is shown in association with switch 118-3. The network appliance 150 serves as a "checking functionality." In certain embodiments, the checking functionality performed by the network appliance 150 can perform the role of an intrusion prevention system (IPS), as may be supplied by a third party vendor of network security devices. In certain embodiments, the checking functionality performed by the network appliance 150 can perform the role of an intrusion detection system (IDS), or another diagnostic device, accounting device, counting device, etc., as may be supplied by a third party vendor. Embodiments are not limited to the examples given here. The configurations and operations of such different checking functionalities are known and understood by one of ordinary skill in the art.

According to an embodiment of the present invention, a network, e.g., network 100, is implemented having a centralized checking functionality, e.g., remote with respect to most network devices. A packet, bound for an original destination address is selected by an originating network device to be subjected to the checking functionality. The packet is tunnel-encapsulated with tunneling information and securely tunneled from the originating network device to a remote network device. Upon receiving the tunneled packet, the remote network device removes the tunneling information, and forwards the decapsulated packet on to the checking functionality. The checking functionality has a destination address different than the original destination address of the packet.

The identity information of the originating network device may be contained in the tunneling information directly, e.g., as the encapsulation IP source address, or indirectly, e.g., as a handle included in the encapsulation generic routing encapsulation (GRE) header, or both, or by some alternative indicating mode. The identity information, or indicator, of the originating network device is retained at the remote network device and associated with the decapsulated packet, for example, by marking the packet with a handle which is operable as an index, i.e., key, to associate the retained identity information of the originating network device with the decapsulated packet.

The remote network device ascertains the identity information of an incoming tunnel-encapsulated packet's originating network device from its tunneling information for packets bound for the checking functionality. The identity information of an incoming tunnel-encapsulated packet's originating network device is contained in the inbound packet's tunnel-encapsulation information, for example, the IP source address (IP_SA) identifies the source network device of the tunnel-encapsulated packet. The remote network device logic is operable to retain that identity information subsequent to the decapsulation of the packet, and associate that identity information with the decapsulated packet, e.g., the identity information is stored in memory located on the remote network device, such as switch 118-3, and associated with the decapsulated packet by an index, i.e., lookup key. According to one embodiment, the packet is marked with a handle used as the key in lookup table(s), as later shown and described in connection with FIGS. 4A and 4B.

Figure 4A:
FIGS. 4A and 4B illustrate example packet configurations according to an embodiment of the present invention.
Figure 4A:
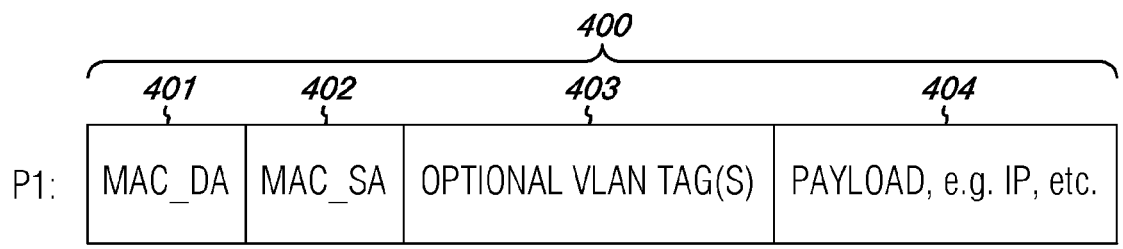
Figure 4A:
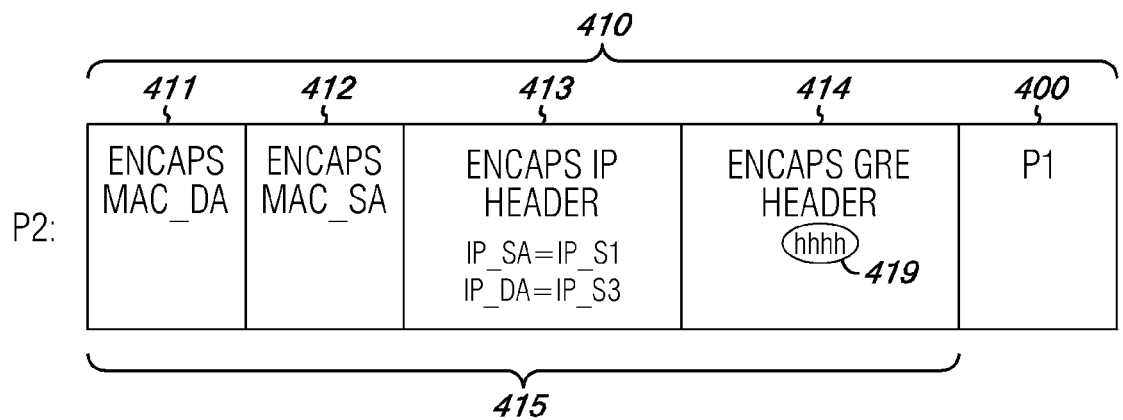
Figure 4A:
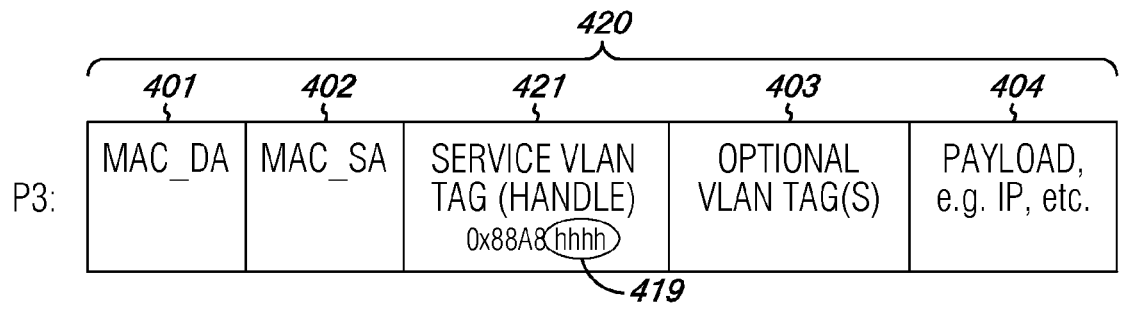
Figure 4B:
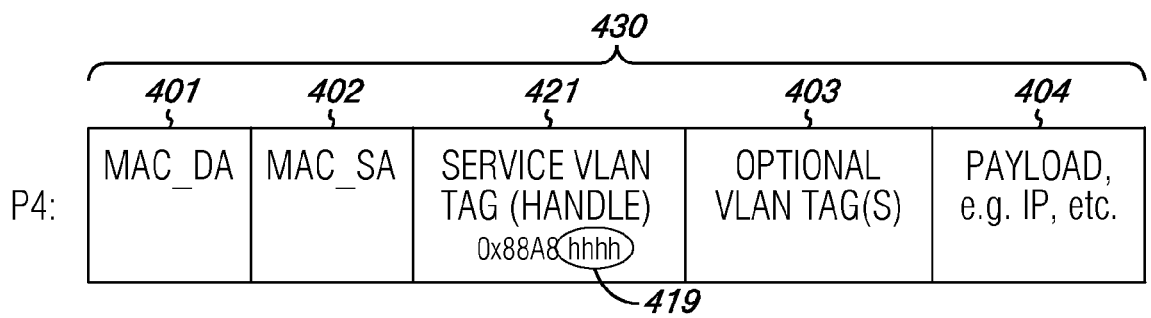
Figure 4B:
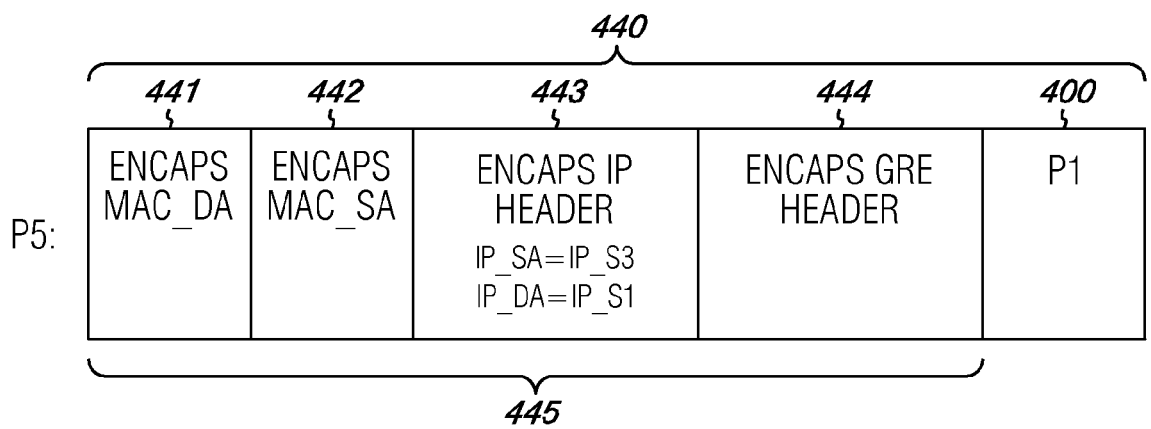

If that decapsulated and marked packet is subsequently returned to the remote network device, e.g., switch 118-3, from the checking functionality, e.g., network appliance 150, the retained identity information of the decapsulated packet's originating network device, e.g., switch 118-1, associated with the packet by the handle, e.g., handle 419 in FIGS. 4A and 4B, is used as a destination address to securely tunnel the packet back to the originating network device, e.g., switch 118-1. Logic on the remote network device, e.g., switch 118-3, is operable to use the identity information of the packet's originating network device, e.g., switch 118-1, as a destination address for returning the packet by secure tunneling back to the originating network device, e.g., switch 118-1. Once back at the originating network device, e.g., switch 118-1, the packet is further processed to resume its forwarding on to its original destination address.

Figure 2:
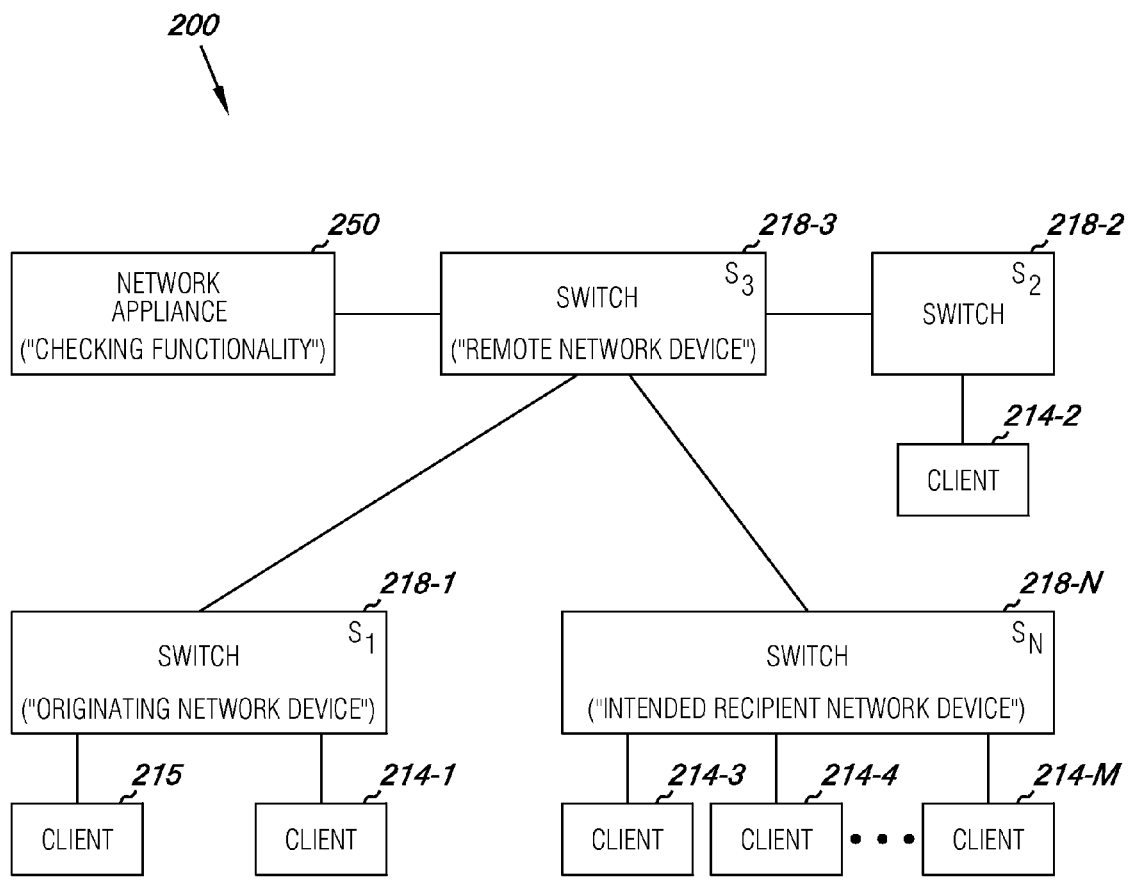
FIG. 2 is a block diagram illustrating a portion of a network, such as shown in FIG. 1, having network devices which can implement embodiments of the present invention.

FIG. 2 illustrates a portion of a network 200, e.g., network 100 shown in FIG. 1, including embodiments of network devices, 218-1, 218-2, 218-3, . . . , 218-N, suited to implement techniques according to embodiments of the present invention. The network devices shown in FIG. 2, e.g., 218-1, 218-2, 218-3, . . . , 218-N, etc., can include switches, routers, hubs, etc. Switch $S_1$ 218-1 has a number of clients communicatively coupled thereto, e.g., 214-1 and 215. Likewise, switches $S_2$ and $S_N$ also have client(s) communicatively coupled thereto, e.g., 214-2, 214-3, 214-4, . . . , 214-M. Switch $S_3$ may, or may not, have clients connected thereto; however, the client(s) of switch $S_3$ are omitted from FIG. 2 to simplify discussion of embodiments of the present invention.

As shown in the embodiment of FIG. 2, a checking functionality, e.g., network appliance 250, has been located in a "centralized" location relative to a given network architecture, e.g. associated with switch $S_3$ 218-3 in network 200. As the reader will appreciate, this example embodiment of the checking functionality, e.g., network appliance 250, being in a centralized location does not require association of the checking functionality with a central network device. That is, the centralized location of the checking functionality, e.g., network appliance 250, may alternatively be associated with an "edge" network device having ports connected directly to network clients, e.g., 214-1, . . . , 214-M and 215.

Since network 200 includes a centralized checking functionality, e.g., network appliance 250, rather than multiple in-line checking functionalities, data packets requiring screening are diverted to the checking functionality. In this example, a packet would be diverted to the checking functionality, e.g., network appliance 250, for processing, and returned if cleared, to continue being forwarded towards its original destination. Accordingly, the network device which determines whether a data packet is to be diverted to the checking functionality, and which initiates the data packet on its way to the checking functionality, is referred to herein as the "originating network device," e.g., switch $S_1$ 218-1. The network device to which the packet is sent to reach the checking functionality, e.g., to which the checking functionality is integral to, or most directly communicatively coupled to, is referred to herein as the "remote network device," e.g., switch $S_3$ 218-3. The network device to which the packet was intending to reach (before being diverted to the checking functionality), e.g., network appliance 250, in order to arrive at its destination, e.g., client 214-4, is referred to herein as the "intended recipient network device," e.g., switch $S_N$ 218-N.

In some embodiments of the present invention, computer executable instructions and/or logic can extract information from the fields of packet headers, e.g., MAC header, IP header, etc., which can be used for purposes such as determining whether packets correspond to a number of criteria as determined by packet information, e.g., the source and/or destination IP addresses, the source and/or destination ports, the source and/or destination VLAN, etc. Additionally, the instructions can monitor, based on the IP flow, those packets which meet the criteria by extracting information from the fields of the IP header which correspond to the IP flow, i.e., the IP source address and the IP destination address. In this manner, membership within logical groups, or within logical regions, or in accordance with other network protocols, can be used to function as logical boundaries causing a data packet to be diverted to the checking functionality, e.g., network appliance 250, from its regular forwarding logic.

Figure 3:
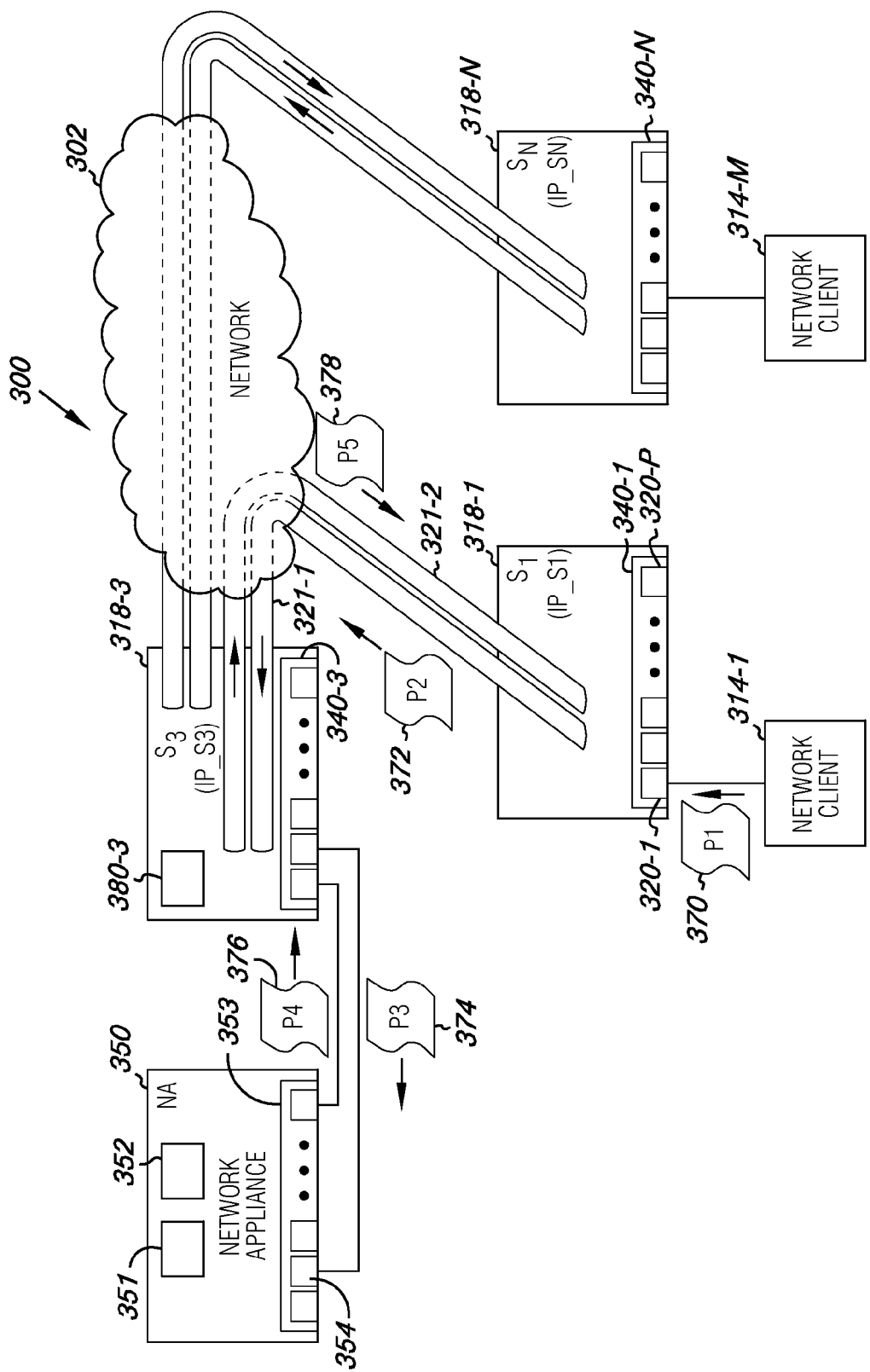
FIG. 3 illustrates a portion of a network, such as shown in FIG. 1, having network devices which can implement embodiments of the present invention.

FIG. 3 illustrates network 300, including a number of network devices. The network devices shown in FIG. 3, e.g., 318-1, 318-3, ..., 318-N, etc., can include switches, routers, hubs, etc. Although such detail is not shown in FIG. 3, such network devices, 318-1, 318-3, ..., 318-N, etc, can include processor(s) and memory resources. The network devices, 318-1, 318-3, ..., 318-N, etc., can similarly include a number of network chips, e.g., 340-1, 340-3, ..., 340-N, etc., including logic circuitry (hardware) which can execute instructions and/or logic. Each network chip can include a number of network ports, e.g., 320-1, ..., 320-P, etc. to send and receive data packets (network traffic) throughout the network 300. As mentioned above, the logic circuitry of the number of network chips can be in the form of ASICs and include logic to serve as a media access controller (MAC). The number of ports, which can be included on a network chip, can have access to logic circuitry associated with the network chip and to the processor and memory. A crossbar, crosslink, and/or switching fabric, as the same will be understood by one of ordinary skill in the art, can connect multiple ports and/or multiple chips.

As shown in FIG. 3, a network appliance 350 can be connected to a network device, e.g., switch 318-3, which may be a centralized network device. The network appliance 350 could also be implemented as an integral part of switch 318-3. The network appliance 350 can include processor 351 and memory resources 352 capable of storing and executing instructions to perform a particular role or function. The network appliance can also include one or more chips, e.g., ASICs, having logic and a number of ports, e.g., port 354, as ports have been described above. Network devices, e.g., switch 318-3, which are communicatively coupled to a checking functionality, e.g., network appliance 350, or have a checking functionality implemented therein, may also include one or more lookup tables, e.g., lookup table 380-3 (described further in connection with FIG. 5) associating IP source address information, or other identifying information, e.g., of network devices originating packets being received, with a handle for marking data packets in order to retain and recover identity information of the packet's originating network device, e.g., switch 318-1.

In some embodiments of the present invention, the network appliance 350 is an intrusion prevention system (IPS), as may be supplied by a third party vendor of network security devices. In some embodiments, the network appliance 350 can be an intrusion detections system (IDS), another diagnostic device, an accounting device, a counting device, etc., as may be supplied by a third party vendor. The operation of such devices will be recognized and understood by one of ordinary skill in the art. Embodiments are not limited to the examples given here.

As shown in the figures and described herein, example embodiments of the present invention include network devices, systems, and methods, having logic to tunnel packets on a network based on a number of criteria. As described in connection with FIG. 2, embodiments include a network device that includes a network chip having a number of network ports for the device. The network chip includes logic to select original data packets received from or destined to a particular port on the device, based on a number of criteria, and to tunnel, e.g., securely tunnel, the selected data packets to a second network device (i.e., a remote network device) different from an original destination address of the selected data packets. Secure tunnels are represented in FIG. 3 as tunnels 321-1 and 321-2 through network 302. An example of logic to select original data packets received from or destined to a particular port, e.g., port 320-1, on a network device, based on a number of criteria, and to tunnel, e.g., using tunnel encapsulation, the selected data packets to a second network device, i.e., from an originating network device to a remote network device, having a destination address different from an original destination address of the selected data packets is provided in co-pending, co-assigned U.S. patent application Ser. No. 11/712,706, entitled, "Packet Tunneling", filed on Mar. 1, 2007, having common inventorship. The same is incorporated herein in full by reference.

FIG. 3 illustrates a network 300 including a remote checking functionality embodied in the network appliance 350, which is communicatively coupled to switch $S_3$ 318-3. In turn, switch $S_3$ 318-3 is communicatively coupled to a number of other switches in the network, e.g., switch $S_1$ 318-1, and switch $S_N$ 318-N. Switch $S_1$ 318-1 has at least one client communicatively coupled thereto, e.g., network client 314-1. Likewise, switch $S_N$ 318-N also has at least one client communicatively coupled thereto, e.g., network client 314-M. Network 300 utilizes a centralized checking functionality to perform, for example, security protocols, instead of employing dispersed security features, such as in-line devices. According to embodiments described herein, a packet may be stolen from a particular port, e.g., port 320-1, tunneled from a first network device, e.g., an originating network device such as switch 318-1, to a second network device, e.g., a remote network device to which the checking functionality is communicatively coupled such as switch 318-3; forwarded from the second network device to the checking functionality, e.g., network appliance 350; returned from the checking functionality to the second network device, e.g., switch $S_3$ 318-3; and then return-tunneled to the first network device, e.g., switch $S_1$ 318-1.

As noted above, co-pending, co-assigned U.S. patent application Ser. No. 11/712,706, entitled, "Packet Tunneling", filed on Mar. 1, 2007, having common inventorship, provides an example of logic on an originating network device, e.g., switch $S_1$ 318-1, to select original data packets received from or destined to a particular port, e.g., 320-1, ..., 320-P, on the network device, based on a number of criteria, and to tunnel encapsulate the selected data packets to a second (remote) network device, e.g., switch $S_3$ 318-3, different from an original destination address of the selected data packets. Such packets could then be operated upon by a checking functionality, e.g., network appliance 350, associated therewith, and cleared, e.g., approved. Subsequently, packets can be returned to the originating network device, e.g., switch $S_1$ 318-1, using a method such as described in the above cited co-pending application.

Referring now to FIG. 3, in conjunction with FIGS. 4A and 4B, a data packet 370, having a configuration P1, is initially received at a network device 318-1 from a network client 314-1 through a port 320-1. The initially received data packet 370 is referred to hereinafter as an original (data) packet. FIG. 4A illustrates a packet 400 having a P1 configuration. The P1 configuration includes an original MAC destination address, e.g., MAC_DA 401, an original MAC source address, e.g., MAC_SA 402, optional VLAN tag(s), e.g., 403, and a payload, e.g., 404.

According to embodiments of the present invention, an original data packet may be selected to be diverted from its initial destination and tunneled to a remote checking functionality. Original data packet 370 is encapsulated for tunneling, the tunnel-encapsulated packet 372 having a P2 configuration. FIG. 4A illustrates an embodiment of a packet 410 having a P2 packet configuration, which includes the P1 original data packet 400 and an encapsulation header 415. The encapsulation header 415 includes the encapsulated packet's destination address, e.g., ENCAPS MAC_DA 411; the encapsulated packet's source address, e.g., ENCAPS MAC_SA 412; encapsulation Internet protocol (IP) header information 413, and a GRE header 414. Other encapsulation header 415 examples include Ethernet-within-IP (RFC3378), Layer 2 Tunneling Protocol (L2TP-RFC3931), etc.

Optionally, contained in the key field of the encapsulation GRE header is a handle value 419, e.g., shown as hhhh within 414 in FIG. 4A, that is unique to switch $S_1$. Generation of this handle 419 is discussed in further detail below. The packet 372 having a P2 configuration is shown in FIG. 3 being tunneled from an originating network device, e.g., switch $S_1$ 318-1, using secure tunnel 321-1 through network 302 to a remote network device, e.g., switch $S_3$ 318-3. As indicated, switch $S_1$ has an IP address denoted as and switch $S_3$ has an IP address denoted as IP_S3. Therefore, the encapsulation IP header information, e.g., 413, for the packet 372 having a P2 configuration illustrated in FIG. 3 includes an IP source address, e.g., IP_SA, set to the IP address of switch $S_1$, e.g., IP_SA=IP_S1, and an IP destination address, e.g., IP_DA, set to the IP address of switch $S_3$, e.g., IP_DA=IP_S3. Additional information in the encapsulation header may also be used to indicate to the remote network device, e.g., switch $S_3$ 318-3, that the packet is to be forwarded upon receipt to the checking functionality, e.g., network appliance 350. The further details of encapsulation GRE header 414 are not relevant to understanding the embodiments of the present invention; however, the handle is denoted by hexadecimal notation "hhhh" as being representative of appropriate information necessary to facilitate the packet tunneling operations described herein from switch $S_1$ to switch $S_3$.

Tunnel-encapsulated network packet 372, having configuration P2, is transmitted through a tunnel 321-1 established between switches $S_1$ and $S_3$ as shown in FIG. 3. According to some embodiments, tunnel 321-1 and tunnel 321-2, are secure tunnels achieved by encapsulating the original data packet using a secure encapsulation technique, e.g., IPSec. Tunnels 321-1 and 321-2 need not be physical tunnels, and may in fact be virtual tunnels originated and removed as needed between network devices. Upon egress from secure tunnel 321-1, tunnel-encapsulated network packet 372 is received at a remote network device, e.g., switch $S_3$, 318-3 in FIG. 3. Switch $S_3$ recognizes that the received packet needs to be sent on to the network appliance, e.g., by examination of the encapsulation header fields.

As discussed above, a tunnel-encapsulated packet header includes information identifying the originating network device, e.g., switch $S_1$ in FIG. 3, such as the encapsulating IP source address (IP_SA in the encapsulation IP Header) 413 shown in FIG. 4, or by using the handle 419 included in the encapsulation GRE header 414. Logic on the remote network device, e.g., switch $S_3$ 318-3 is operable to ascertain, i.e., read, this identity information of the network packet's originating network device, e.g., switch $S_1$ 318-3, from the encapsulation header information of the received encapsulated network packet. The logic can optionally extract the identity information from the encapsulation header. This identity information is stored in memory, for example in a lookup table, e.g., 380-3. According to one embodiment of the present invention, the identity information may be stored in memory prior to the packet's arrival, for example, as the network is configured. According to another embodiment, the identity information may be stored in memory concurrent with the arrival and processing of the packet to the (remote) network device, e.g., switch $S_3$ 318-3.

According to one embodiment of the present invention, switch $S_3$ copies the IP source address (i.e., IP_SA) of the encapsulation IP header 413 and the handle hhhh 419 (from the ENCAPS GRE header 414) into a handle binding table, e.g., 380-3. This can all be done before, during, or after information identifying the originating network device, e.g., switch $S_1$ 318-1, of the tunnel encapsulated packet is ascertained and stored at the remote network device, e.g., switch $S_3$ 318-3; before, during or after the packet is decapsulated to remove the tunnel encapsulation header or marked with a handle 419. The handle functions as the index to the identity information of that packet's originating network device, e.g., switch $S_1$ 318-1. The order of these operations is a design choice intended to decapsulate the packet, while retaining the association of the originating network device, e.g., switch $S_1$ 318-1, identity with the packet. In this manner, the remote network device, e.g., switch $S_3$ 318-3, generates a packet having packet configuration P3.

Assignment of unique handle values 419 to each network device, e.g., switch, can be done in several ways. For example, a network operator can manually assign each switch a unique ID, which can then be associated with a corresponding handle 419 in a lookup function. Another method includes having a separate network protocol, e.g., using a secure TCP connection, to allow handle values 419 to be obtained from a central location, e.g., a server, or the remote network device to which the checking functionality, e.g., network appliance 350, is attached, e.g., switch $S_3$ 318-3. Using this methodology requires each switch to know the IP address of the remote network device to which the checking functionality is attached, e.g., IP_S3 for switch $S_3$ 318-3. Originating network devices, e.g., switch $S_1$ 318-1, could then request and be sent a handle value 419. The remote network device, e.g., switch $S_3$ 318-3, would hand out handles 419 to requesting switches from a table, ensuring that no duplicated handles 419 are ever issued.

The decapsulated packet, now having a P3 packet configuration, is then forwarded on from the remote network device, e.g., switch $S_3$ 318-3, to the checking functionality, e.g., network appliance 350. FIG. 4A illustrates an embodiment of a packet 420 having a P3 packet configuration, which is similar to the P1 packet configuration of the original data packet, including its original MAC destination address, e.g., MAC_DA 401, its original MAC source address, e.g., MAC_SA 402, optional VLAN tag(s), e.g., 403, and its original payload, e.g., 404. Notably, in addition to the optional VLAN tag(s) information 403 of the P1 packet configuration, a service VLAN tag 421 is included within which the handle 419 is stored. Thus, the handle 419, e.g., hhhh, is inserted into the service VLAN tag(s) 421 of the packet 374. In this manner, the handle 419, associated with that packet's originating network device identity, is carried along with the packet to effectively maintain the association between the packet and the network device, e.g., switch $S_1$ 318-1, which originally diverted the packet to the checking functionality, e.g., network appliance 350.

The insertion of VLAN tags in a packet is standardized, generally well understood, and generally compatible with networking equipment. Thus, using a service VLAN tag for insertion of a handle 419 into a packet provides an exceptionally "transparent" method for marking a packet. Needless to say marking a data packet with a lookup key, e.g., handle 419, is also more efficient from a bandwidth perspective, rather than marking (i.e., inserting) the packet with the full IP address of the originating network device.

Just as the remote network device, e.g., switch $S_3$ 318-3, needs to know how to "bind" handles to physical switch locations in order to properly return packets to their respective originating network device, the checking functionality network appliance may also need to know how to "bind" handles to physical switch locations. If the network appliance supports virtualization, it would already be operable with knowledge of the network topology, and would thus only need to have the set of handle values associated with the corresponding physical locations. If the checking functionality, e.g., network appliance 350, does not support virtualization, i.e., it cannot use the handle 419, it can ignore the service VLAN tag, e.g., 421, and continue to otherwise process the packet. Assuming the checking functionality does not modify the service VLAN tag portion containing the handle 419, then the remote network device, e.g., switch S3 318-3, can still use the handle 419 upon the packet's return from the checking functionality to determine the originating network device to which to return the packet.

According to one embodiment, the format of service VLAN tags is a 16 bit Ethernet type (0x88A8 in the example illustrated in FIG. 4A at 421), which is a standard value (according to the IEEE 802.1Q/802.1Qad standards), followed by a 16 bit Tag Control Information (TCI) field. The handle 419 is stored in this TCI. Although the TCI field is 16 bits wide, not all of these bits may be available for use as handle bits; therefore, a handle 419 may be less than 16 bits. The embodiments of the present invention are not so limited, and a handle 419 may be of any configuration suitable for marking a packet so as to track its originating network device, e.g., switch $S_1$ 318-1.

In some embodiments, logic, e.g. hardware circuitry on an application specific integrated circuit (ASIC), is provided to receive a tunnel-encapsulated network packet from the originating network device, i.e., the network device at which the network packet was encapsulated and from which its tunneling began. The logic is operative to ascertain and store the identity information of the originating network device, i.e., the IP source address of the packet's tunneling header, e.g., IP_SA of ENCAPS IP HEADER 413, and the handle already marked into the packet's encapsulation header, for a future lookup operation. The logic is further operative to decapsulate the tunnel-encapsulated packet and mark the packet with the handle and forward the decapsulated packet on to a network appliance, for example, a checking functionality. For example, the handle can be written into an available data field of the decapsulated packet, such as in a service VLAN tag field not otherwise used by a particular network, or network device. In this manner, a representation of the location of the identity information of the originating network device from which the packet was originally diverted toward the checking functionality, is carried along with the packet on subsequent forwarding operations.

As discussed above, the handle 419 functions as a key that is associated with the identity information of the packet's originating network device. The handle 419 serves as a key traceable to the stored identity information of originating network device. For example according to one embodiment, the handle 419 is an key in a lookup function, such as a lookup table, corresponding directly to the identity information of originating network device information also stored in the lookup table. According to an alternative embodiment, the handle 419 is an key in a lookup function, such as a lookup table, corresponding to the location in memory where the identity information of originating network device information is stored. Implementation of the lookup table may be by any standard search method, e.g., hash table, hardware-based Content Addressable Memory (CAM), etc.

A handle 419 may be unique to a (originating) network device identity, the identity of a packet's originating network device causing that packet to be marked with a handle 419 previously associated with that originating network device, i.e., all packets from that originating network device being marked with the same corresponding handle 419. Alternatively, a handle 419 may be unique to an ingress port on a (originating) network device, e.g., for packet 372 (having a P2 configuration), the handle hhhh 419 uniquely represents port 320-1 on switch 318-1, i.e., the original port on which packet 370 (having configuration P1) entered switch 318-1.

Figure 5:
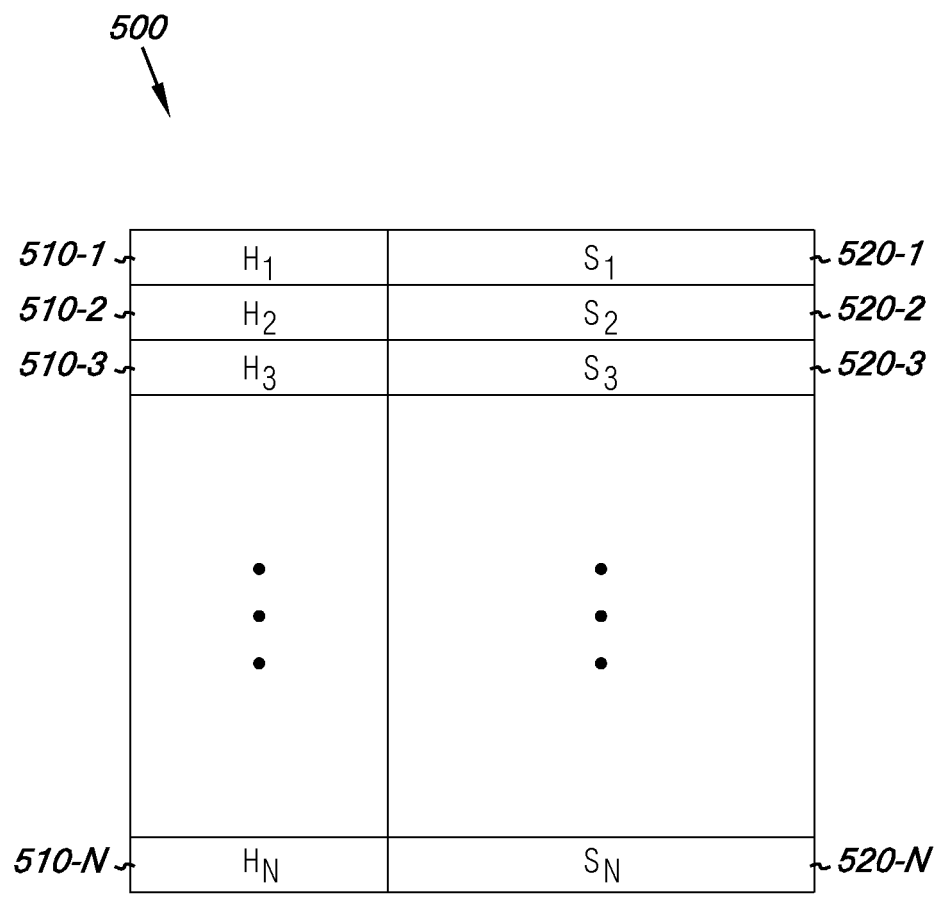
FIG. 5 illustrates an example lookup table used to identify a packet's originating network device corresponding to a handle according to an embodiment of the present invention.

FIG. 5 illustrates one example embodiment of a lookup function relating handles, e.g., 510-1, 510-2, 510-3, ..., 510-N, with associated network device information, e.g., $S_1$, $S_2$, $S_3$, ..., $S_N$, shown in FIG. 5 at 520-1, 520-2, 520-3, ..., 520-N respectively. The designator "N" is used to indicate that lookup table 500 may contain a number of relational entries between handles and network device information. Lookup table 500 is used to store the identity information associated with the originating network device, and correlate the identity information to a handle. Handles H1, H2, H3, ..., HN are shown in the left column of the lookup table 500, e.g., table entries 510-1, 510-2, 510-3, ..., 510-N. Identifying information for correlated network devices, e.g., for switches $S_1, S_2, S_3, \ldots, S_N$, are shown in the right column of the lookup table 500, e.g., table entries 520-1, 520-2, 520-3, ..., 520-N respectively. The identifying information stored in table 500 is, for example, the IP address of a respective originating network device if the handle is directly correlated to the identifying information. Alternatively, the identifying information is, for example, memory location information, e.g., a memory address, containing the IP address of a respective originating network device if the handle is indirectly correlated to the identifying information. One having ordinary skill in the art will appreciate there are many methods, which can be implemented in hardware and/or software arrangements, that may effectively be used to correlate the handle with the necessary information identifying a respective originating network device.

Referring once again to FIG. 3, packet 374 having a P3 configuration, including a handle, is forwarded from the remote network device, e.g., switch $S_3$ 318-3, to the checking functionality, e.g., network appliance 350, for further processing. The checking functionality, e.g., network appliance 350, processes the packet according to whatever functionality it is performing for the network, e.g., security checking, accounting, counting, etc. The network appliance, e.g., network appliance 350, may examine the handle 419 in the service VLAN tag 421, and uses it to identify the switch from which the packet originated, e.g., switch $S_1$ 318-1 in this example. Additionally, if the handle 419 serves as a key to the original ingress port identity as well as the originating network device identity, the checking functionality, e.g., network appliance 350, can use this additional information to apply more advanced security protocols, e.g., port-level security checks to detect client moves, address spoofing, etc., accounting protocols, counting protocols, etc. Having identity information for the originating ID network device available allows the network appliance to perform its network virtualization, i.e., it can then perform the checking functionality as if it is local to the originating network device, e.g., switch $S_1$ 318-1, in this example. Alternatively, the checking functionality may ignore the service VLAN tag(s), and/or the handle contained therein, and process the packet without reference to its originating network device.

If a packet does not clear the checking functionality, it may be dropped to conclude its processing, and thus never return from the checking functionality to switch S₃. However, if a packet does clear, i.e., is approved, or otherwise successfully completes the checking functionality processing, it is returned from the checking functionality to switch S₃ as shown in FIG. 3 by packet 376 having packet configuration P4.

FIG. 4B illustrates an embodiment of a packet 430 having a P4 packet configuration, which may, but need not be identical to the P3 packet configuration. Packet 430 having a P4 packet configuration is shown to include a MAC destination address, e.g., MAC_DA 401, a MAC source address, e.g., MAC_SA 402, optional VLAN tag(s) 403, a service VLAN tag 421, and a payload, e.g., 404. Implementation of the embodiments of the present invention do not preclude the checking functionality, e.g., network appliance 350, from modifying a packet as it is processed by the checking functionality, e.g., network appliance 350, nor does it preclude not modifying the packet during processing. However, if the checking functionality, e.g., network appliance 350, is operable to modify a packet in some manner during its processing, method embodiments of the present invention do not necessarily require the handle 419 be unmodified, but rather that the association between the packet and its originating network device, e.g., switch S₁ 318-1, remain intact.

When the remote network device, e.g., switch S₃ 318-3, receives the packet, having a P4 packet configuration, returned from the checking functionality, e.g., network appliance 350, it determines that the packet needs to be securely tunneled back to its originating network device, e.g., switch S₁ 318-1. By examining the handle 419 from the service VLAN tag 421, the remote network device, e.g., switch S₃ 318-3, uses the "handle binding table," e.g., the lookup table 380-3, to locate the entry relating to the handle value 419, e.g., "hhhh" in this example. Using the handle 419 as a key, the corresponding IP address of the originating network device, e.g., IP_S1 in this example, stored in the lookup function, and to which the packet is to be returned, is recovered and used for subsequent packet forwarding processing.

The remote network device, e.g., switch S₃ 318-3, creates packet 378 having a P5 packet configuration utilizing the identity information of the packet's originating network device, e.g., switch S₁ 318-1. A packet having a P5 packet configuration 440 is illustrated in FIG. 4B. Packet configuration P5 is similar to packet configuration P2. The remote network device, e.g., switch S₃ 318-3, creates the tunnel-encapsulated packet having a P5 packet configuration by removing the service VLAN tag from the packet, e.g., 421 of the P4 packet configuration, and pre-pending a new encapsulation header 445 to the packet. Packet configuration P5 is similar to packet configuration P2, and includes the P1 original data packet 400 and the encapsulation header 445. The encapsulation header 445 includes the encapsulated packet's destination address, e.g., ENCAPS MAC_DA 441; the encapsulated packet's source address, e.g., ENCAPS MAC_SA 442; an encapsulation internet protocol (IP) header information 443, and a generic routing encapsulation (GRE) header 444. For the return transport, the encapsulation IP source address is now (from) switch S₃ (i.e., IP_SA=IP_S3) and the encapsulation IP destination address is now (to) switch S₁ (i.e., IP_DA=IP_S1) reflecting the reverse direction of travel. As with tunnel-encapsulation packet configuration P2, other encapsulation header 445 formats include Ethernet-within-IP (RFC3378), Layer 2 Tunneling Protocol (L2TP-RFC3931), etc.

The tunnel-encapsulated packet is then sent by the remote network device, e.g., switch S₃ 318-3, back to the originating network device, e.g., switch S₁ 318-1. The originating network device, e.g., switch S₁ 318-1, is operable to decapsulate the tunnel-encapsulated packet, i.e., remove the encapsulation header 445, thus leaving the packet having its original P1 packet configuration. Thereafter, the packet can continue to be forwarded on to its intended recipient network device as appropriate. Co-pending, co-assigned U.S. patent application Ser. No. 11/784,664, entitled, "Locating Original Port Information," filed on Apr. 9, 2007, having common inventorship, provides an example of logic on an originating network device for processing a packet returning from a checking functionality and applying regular forwarding logic thereto. The same is incorporated herein in full by reference.

Using a method similar to that described above with respect to switch S₁ and S₃, other network devices, e.g., switch S_N 318-N, may also divert packets and send them to the checking functionality and have them appropriately returned. Packets originating from other network devices will, of course, be marked with a different handle, e.g., yyyy, indicative of a different originating network device. As such, the checking functionality will see a different handle within a packet as part of the service VLAN tag, and so can virtualize its location correctly to that different (originating) network device, i.e., the checking functionality network appliance "thinks" it is local to switch S_N 318-N when processing a packet therefrom as determined from the handle yyyy with which the packet is marked corresponding to switch S_N.

Through similar lookup processes, or other methodology, a handle is capable of conveying, or corresponding to, more information than just a respective packet's originating network device, e.g., switch S₁ 318-1. For example, handles could be made more specific, such as to correspond not only with the originating network device, e.g., switch S₁ 318-1, but also the original ingress port, e.g., port 320-1, to that originating network device, or any other physical or logical property which may be helpful in future processing of a particular packet. According to one embodiment, a handle, e.g., handle 419, consists of two (2) portions, a first portion of the handle corresponding to a unique handle for a packet's originating network device, e.g., switch S₁ 318-1, and a second portion of the handle corresponding to the original ingress port to that originating network device, e.g., port 320-1.

When the packet arrives at the checking functionality, e.g., network appliance 350, marked with such a multiple-part handle, the checking functionality, e.g., network appliance 350, may ascertain both the location of the originating network device, e.g., switch S₁ 318-1, for virtualization or other purposes, and the identity of the original port of ingress to the (originating) network device which triggered the packet's diversion to the checking functionality, e.g., network appliance 350. This additional knowledge may allow the checking functionality, e.g., network appliance 350, to perform a better, or a more thorough analysis of the packet, e.g., to implement more advanced security rules, etc. In this manner, the packet may be marked with a handle 419 that corresponds to multiple pieces of relevant information associated with a packet.

The bit width of a handle 419, or the constituent fields comprising a handle, is determined from the quantity of devices, or ports, or other permutations of information to be encoded by the handle. Conversely, the amount of information which may be encoded by a handle 419 may be limited by the bit width of available bits within the packets, e.g., limited to the 12 bits available in the service VLAN tag field (i.e., 16 total minus 4 used to indicate the COS and CFI fields). For example, if 12 bits are available for use as a handle, 5 could be used to reference originating network device (supporting identification of up to 32 unique switches for example), and the remaining 7 bits could be used to reference ingress port information (supporting identification of up to 128 ports on each switch that can have monitored traffic). Embodiments of the present invention are not limited to these quantities and/or bit divisions and/or number of divisions of distinct information into which the handle may be parsed.

Figure 6A:
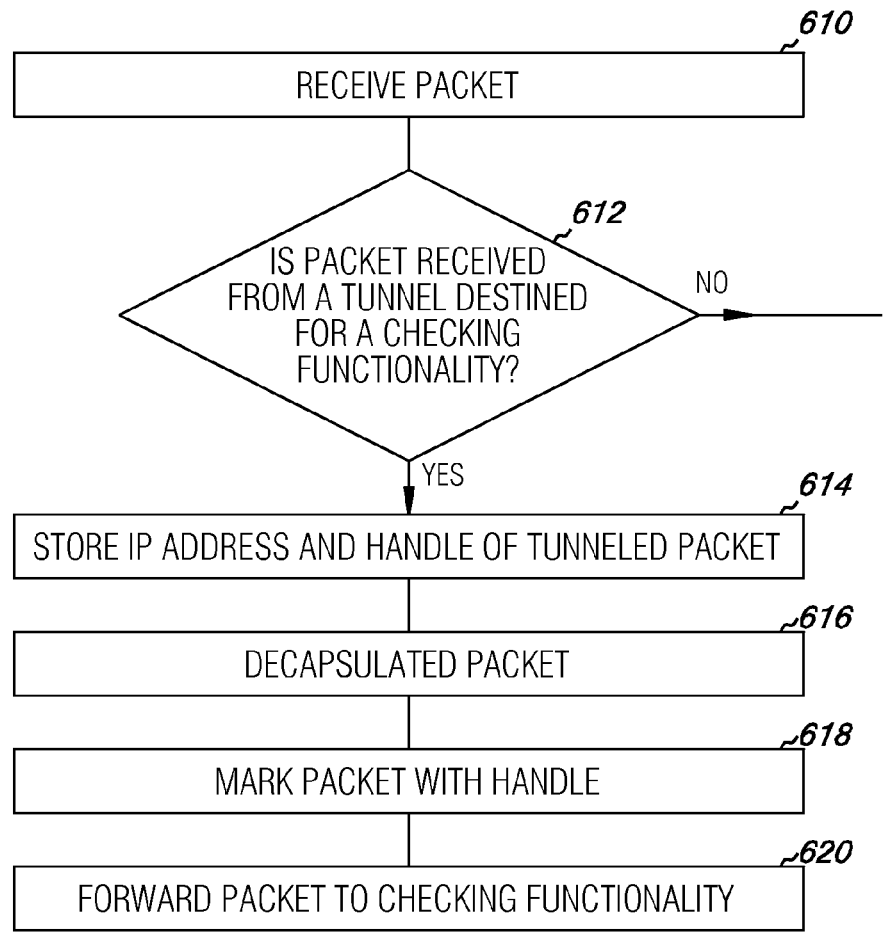
FIGS. 6A and 6B provide a flow chart illustrating one method for marked packet forwarding according to an embodiment of the present invention.
Figure 6B:
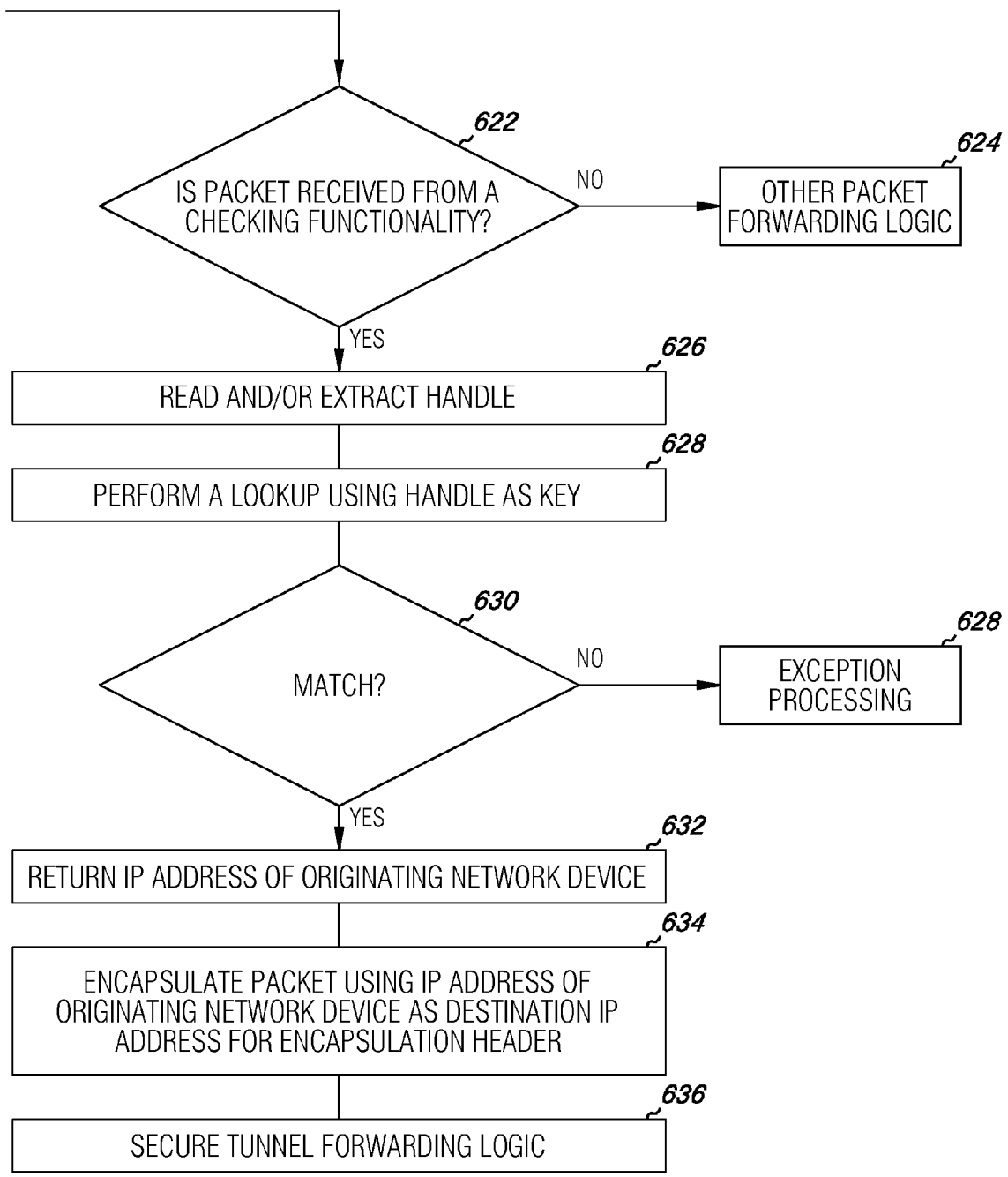

FIGS. 6A and 6B illustrate one method 600 for implementing packet return forwarding. A network packet diverted to a checking functionality is received 610 at a remote network device, e.g., 318-3 in FIG. 3. According to embodiments, logic on the remote network device determines, at 612, from the encapsulation information, e.g., 415 in FIG. 4A, whether that the packet is exiting from a tunnel and bound for a checking functionality. As described above, if the packet received from a tunnel is destined for the checking functionality, the logic stores the IP address, e.g., the IP_SA, of the tunnel-encapsulation header and the handle information contained in the encapsulation GRE header, e.g., 414 in FIG. 4A, at 614. Logic on the remote network device removes the encapsulation header from the original packet, i.e. decapsulates the packet, at 616, to remove encapsulation information, e.g. 415 in FIG. 4A, and marks the packet with a handle at 618 giving the packet a P3 packet configuration, e.g., 420 in FIG. 4A. Logic on the remote network device then forwards the decapsulated and marked packet to the checking functionality, e.g., 350 in FIG. 3, at 620.

A packet is received 610 from the checking functionality at a remote network device, e.g., 318-3 in FIG. 3. According to embodiments, logic on the remote network device determines, e.g., from the port through which the packet is received, that the packet is returning from the checking functionality at 622, and recognizes the packet is not being received from a tunnel and is not bound for the checking functionality at 612. As shown at block 626, the logic then reads or extracts the handle from the packet, e.g., extracts the service VLAN tag 421 in FIG. 4B, and performs a table search using the handle as the key, i.e., performs a lookup at 628 using, for example, lookup table 500 in FIG. 5 (lookup table also shown as 380-3 in FIG. 3), to determine a match at 630. If a matching handle is found, IP address information associated with the originating network device, e.g., 318-1 in FIG. 3, from which the original packet was initially diverted to the checking functionality, e.g., to the remote network device, is returned at 632. If the lookup table search does not find a matching handle, as can be the case if the packet is incorrectly configured or under transient conditions, e.g., the network device having a given IP address is unplugged from the network, etc., the packet is diverted to exception processing as shown at 638. As one of ordinary skill in the art will appreciate the instances where a matching handle is not found in the look up table search may be an infrequent occurrence and hence is treated as exception processing in this example.

If a match is found during the lookup table search using the handle, the return IP address of the originating network device is returned at step 632, and the packet is tunnel-encapsulated using the IP address of the originating network device as the destination IP address of the encapsulation header at 634. The tunnel-encapsulated packet is returned to the originating network device using secure tunnel forwarding at 636.

Figure 7:
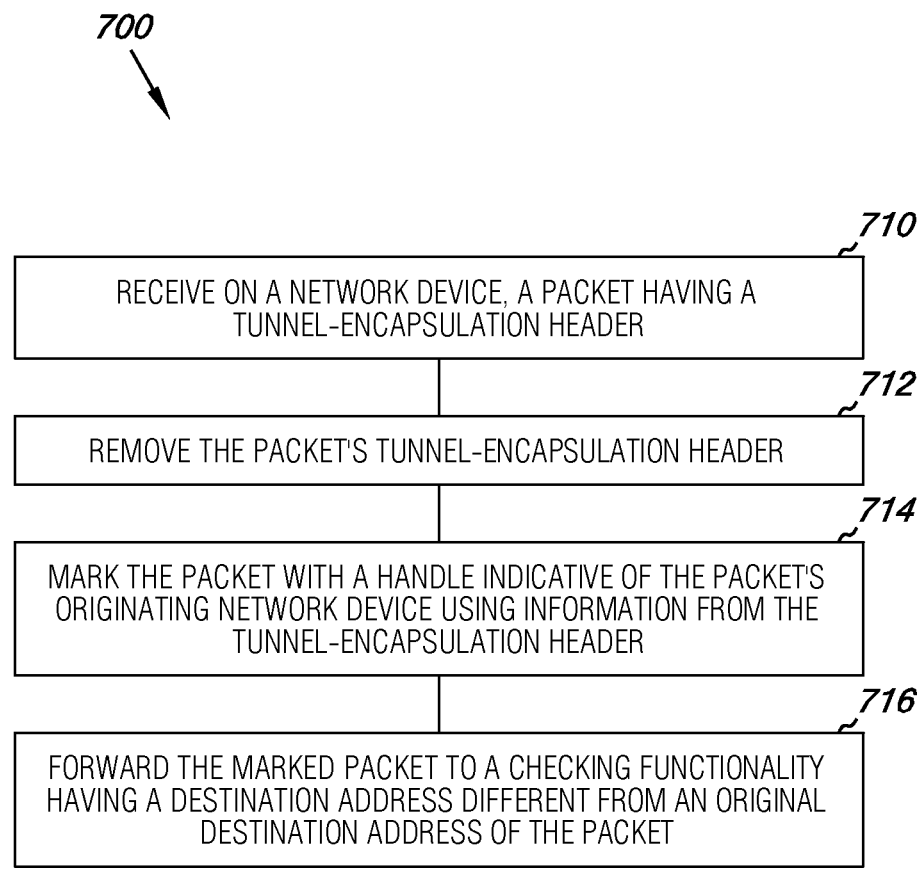
FIG. 7 illustrates a method for marked packet forwarding.

FIG. 7 illustrates a method 700 for marked packet forwarding. The method includes receiving a packet on a network device, the packet having a tunnel-encapsulation header, as shown at block 710. Block 712 illustrates removing the packet's tunnel-encapsulation header. Block 714 illustrates marking the packet with a handle indicative of the packet's originating network device using information from the tunnel-encapsulation header. The method further includes forwarding the marked packet to a checking functionality having a destination address different from an original destination address of the packet as shown at block 716. Logic, which is operable to perform the method described in connection with FIG. 7 can be present in whole or in part in embodiments of other figures. Embodiments, however, are not limited to the example given herein.

It is to be understood that the above description has been made in an illustrative fashion, and not a restrictive one. Although specific embodiments have been illustrated and described herein, those of ordinary skill in the art will appreciate that other component arrangements and device logic can be substituted for the specific embodiments shown. The claims are intended to cover such adaptations or variations of embodiments of the present invention, except to the extent limited by the prior art.

In the foregoing Detailed Description, various features are grouped together in a single embodiment for the purpose of streamlining the disclosure. This method of disclosure is not to be interpreted as reflecting an intention that any claim requires more features than are expressly recited in the claim. Rather, as the following claims reflect, inventive subject matter lies in less than all features of a single disclosed embodiment. Thus, the following claims are hereby incorporated into the Detailed Description, with each claim standing on its own as a separate embodiment of the invention.

What is claimed is:

1. A network chip comprising:
logic to:
identify identity information of an originating network device based on information of a packet received from the originating network device;
determine a handle associated with the originating network device of the received packet using information from a header of the packet;
mark the packet with the handle;
store the handle and the identity information of the originating network device in a memory local to the network chip in a manner that associates the handle with the identity information of the originating network device;
change a destination address of the packet to an address of a checking functionality to redirect the packet to the checking functionality instead of the original destination of the packet; and
forward the marked packet to the checking functionality that detects unwanted network activity.

2. The network chip of claim 1, wherein the logic is further to:
insert the handle into the packet as a service virtual local area network (VLAN) tag.

3. The network chip of claim 1, wherein the logic is further to:
receive the packet from the checking functionality;
perform a lookup in the memory using the handle to determine the identity information of the packet's originating network device after receipt of the packet from the checking functionality, wherein the identity information comprises an IP address of the originating network device;
encapsulate the packet using the IP address as an IP destination address; and
forward the encapsulated packet to the originating network device to continue forwarding of the packet toward the original destination.

4. The network chip of claim 3, wherein the logic is further to:
extract a service VLAN tag containing the handle prior to forwarding the encapsulated packet.

5. The network chip of claim 3, wherein the logic is further to:
associate the handle with an identity of an ingress port on a device in which the network chip is provided, wherein the ingress port comprises the ingress port through which the packet was received into the device.

6. The network chip of claim 5, wherein the logic is further to:
ignore the original destination address of the packet upon return of the packet from the checking functionality.

7. The network chip of claim 1, wherein the logic is further to:
receive the packet from the originating network device as a tunnel-encapsulated packet having an encapsulation header; and
determine the handle from a generic routing encapsulation (GRE) header portion of the encapsulation header.

8. The network chip of claim 1, wherein the logic is further to:
receive the packet from the originating network device, wherein the packet comprises an encapsulated packet diverted using tunnel encapsulation from a path to the original destination by the originating network device;
decapsulate the packet, the packet being received from a tunnel connected to the originating network device;
wherein the originating network device is identified based upon tunnel encapsulation information of the packet.

9. A method for packet forwarding, comprising:
in a network chip,
identifying identity information of an originating network device based on information of a packet received from the originating network device;
determining a handle indicative of the packet's originating network device using information from a header of the packet;
marking the packet with the handle;
storing the handle and the identity information of the originating network device in a memory local to the network chip in a manner that associates the handle with the identity information of the originating network device;
changing a destination address of the packet to an address of a checking functionality to redirect the packet to the checking functionality instead of the original destination of the packet; and
forwarding the marked packet to the checking functionality, wherein the checking functionality detects unwanted network activity.

10. The method recited in claim 9, further comprising:
in the network chip,
receiving the packet from the checking functionality;
determining the identity information of the packet's originating network device corresponding to the handle from the association between the handle and the identity information of the originating network device stored in the memory; and
returning the packet to the originating network device to continue being forwarded toward the original destination.

11. The method recited in claim 10, wherein:
determining the identity information includes performing a lookup in the memory by using the handle to determine the identify information of the packet's originating network device, wherein the identity information comprises an IP address of the originating network device; and
returning the packet includes encapsulating the packet, using the IP address as an IP destination address, and forwarding the encapsulated packet to the IP destination address.

12. The method recited in claim 10, wherein returning the packet to the originating network device further comprises forwarding the packet to the originating network device through a secure virtual tunnel.

13. The method recited in claim 9, wherein a portion of the handle corresponds to the identity of a port of initial ingress of the packet to the originating network device before being diverted to the checking functionality.

14. The method recited in claim 9, further comprising:
in the network chip,
receiving the packet from the originating network device, wherein the packet comprises a tunnel-encapsulation header, and wherein the packet was diverted to the network chip using tunnel encapsulation from a path to the original destination by the originating network device.

15. The method recited in claim 14, further comprising:
in the network chip,
removing the tunnel-encapsulation header of the packet.

* * * * *

UNITED STATES PATENT AND TRADEMARK OFFICE
CERTIFICATE OF CORRECTION

| | |
|---|---|
| PATENT NO. | : 8,611,351 B2 |
| APPLICATION NO. | : 13/026803 |
| DATED | : December 17, 2013 |
| INVENTOR(S) | : Mark Gooch et al. |

It is certified that error appears in the above-identified patent and that said Letters Patent is hereby corrected as shown below:

In the Claims

In column 18, line 20, in Claim 11, delete "identify" and insert -- identity --, therefor.

Signed and Sealed this
Thirteenth Day of May, 2014

Michelle K. Lee
*Deputy Director of the United States Patent and Trademark Office*